(12) United States Patent
Tatsuwaki (10) Patent No.: US 10,000,239 B2
(45) Date of Patent: Jun. 19, 2018

(54) AUTOMOBILE VEHICLE BODY STRUCTURE

(71) Applicant: HONDA MOTOR CO., LTD., Tokyo (JP)

(72) Inventor: Masaaki Tatsuwaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/438,927

(22) Filed: Feb. 22, 2017

(65) Prior Publication Data

US 2017/0247057 A1 Aug. 31, 2017

(30) Foreign Application Priority Data

Feb. 29, 2016 (JP) ................. 2016-036751

(51) Int. Cl.
  *B62D 21/11* (2006.01)
  *B62D 25/02* (2006.01)
  *B62D 25/08* (2006.01)
  *B62D 25/14* (2006.01)
  *B62D 25/20* (2006.01)
  (Continued)

(52) U.S. Cl.
  CPC ............ *B62D 21/11* (2013.01); *B62D 25/025* (2013.01); *B62D 25/145* (2013.01); *B62D 25/2018* (2013.01); *B62D 25/2045* (2013.01); *B62D 25/2081* (2013.01); *B62D 27/023* (2013.01); *B62D 27/065* (2013.01)

(58) Field of Classification Search
  CPC .... B62D 21/11; B62D 21/152; B62D 21/155; B62D 25/025; B62D 25/08; B62D 25/082; B62D 25/14; B62D 25/145; B62D 25/20; B62D 25/2018; B62D 25/2036; B62D 25/2045; B62D 25/2081
  USPC .................. 296/203.02, 204, 193.07, 193.09
  See application file for complete search history.

(56) References Cited

U.S. PATENT DOCUMENTS 7,832,795 B2 * 11/2010 Yokoi ................ B62D 25/2018
  296/193.02
8,485,591 B2 * 7/2013 Kihara ............... B62D 25/2018
  296/193.07
(Continued)

FOREIGN PATENT DOCUMENTS

JP 2004-217108 A 8/2004
JP 3724079 B2 12/2005
(Continued)

OTHER PUBLICATIONS

Office Action dated Aug. 23, 2017, issued in counterpart Japanese Application No. 2016-036751. (3 pages).

*Primary Examiner* — Gregory A Blankenship
(74) *Attorney, Agent, or Firm* — Westerman, Hattori, Daniels & Adrian, LLP (57) ABSTRACT

A rear section upper face of a front side frame is connected to a front face of an inclined wall of a dashboard panel. An attachment bracket that is provided to a rear section lower face of the front side frame and that has a triangular shape in side view supports a support of a subframe. An outrigger is provided that has a vehicle width direction inner end connected to a front wall and a lower wall of the attachment bracket and to a vehicle width direction outer wall of the front side frame, and that has a vehicle width direction outer end connected to a front end of a side sill.

11 Claims, 6 Drawing Sheets

(51) Int. Cl.
    *B62D 27/06*         (2006.01)
    *B62D 27/02*         (2006.01)

(56) References Cited

U.S. PATENT DOCUMENTS

| | | | |
|---|---|---|---|
| 9,487,236 B2* | 11/2016 | Ozawa | B62D 21/152 |
| 2005/0140179 A1* | 6/2005 | Morsch | B62D 25/2018 |
| | | | 296/204 |
| 2009/0146462 A1* | 6/2009 | Sato | B62D 21/152 |
| | | | 296/203.03 |
| 2014/0333056 A1* | 11/2014 | Yoshida | B62D 21/155 |
| | | | 280/834 |
| 2015/0145284 A1* | 5/2015 | Nishida | B62D 25/2036 |
| | | | 296/187.1 |
| 2017/0096169 A1* | 4/2017 | Takeda | B62D 21/11 |
| 2017/0166258 A1* | 6/2017 | Kim | B62D 27/023 |
| 2017/0247057 A1* | 8/2017 | Tatsuwaki | B62D 21/11 |

FOREIGN PATENT DOCUMENTS

| | | |
|---|---|---|
| JP | 2009-6903 A | 1/2009 |
| JP | 2013-119359 A | 6/2013 |
| JP | 2014-4990 A | 1/2014 |

* cited by examiner

AUTOMOBILE VEHICLE BODY STRUCTURE

CROSS REFERENCES TO RELATED APPLICATIONS

The present application claims priority under 35 U.S.C. § 119 to Japanese Patent Application No. 2016-036751, filed on Feb. 29, 2016, entitled "Automobile Vehicle Body Structure." The contents of this application are incorporated herein by reference in their entirety.

TECHNICAL FIELD

The present disclosure relates to an automobile vehicle body structure in which a rear section upper face of a front side frame, which is inclined downward from an upper front toward a lower rear, connects to a front face of an inclined wall of a dashboard panel, which is inclined downward from the upper front toward the lower rear, and a support of a subframe is supported using an attachment bracket, which is provided to a rear section lower face of the front side frame and has a triangular shape in side view.

BACKGROUND

Japanese Patent No. 3724079 describes known technology in which a rear section of a front side frame (extension member 28) is connected to a front face of an inclined wall of a lower section of a dashboard panel. When a subframe (suspension member 35) for supporting a suspension device is fastened to a lower face of the extension member 28 with bolts, a bracket 38 is connected to the extension member 28 in order to reinforce a bolt fastening portion, and an outrigger 40 is connected to the bracket 38.

However, in the related art described above, an upward-facing flange 38*a* that is provided to a vehicle width direction inner end of the bracket 38 is connected to a vehicle width direction inner wall of the extension member 28. Also, a flange 40*a* that is provided to a vehicle width direction inner end of the outrigger 40 is connected to a downward-facing flange 38*b* that is provided to a vehicle width direction outer end of the bracket 38. There is accordingly a concern that the bolt fastening portion of the suspension member 35 cannot be effectively reinforced by the outrigger 40, and that support rigidity of the suspension member 35 would be insufficient and steering stability of the vehicle would decrease.

SUMMARY

The present application describes, for example, an automobile vehicle body structure in which support rigidity of a subframe with respect to a rear section of a front side frame is raised, and steering stability of a vehicle is improved.

A first aspect of the present disclosure is an automobile vehicle body structure for connecting a rear section upper face of a front side frame, which is inclined downward from an upper front toward a lower rear, to a front face of an inclined wall of a dashboard panel, which is inclined downward from the upper front toward the lower rear, and for supporting a support of a subframe using an attachment bracket, which is provided to a rear section lower face of the front side frame and has a triangular shape in side view. The automobile vehicle body structure includes an outrigger that has a vehicle width direction inner end connected to a front wall and a lower wall of the attachment bracket and to a vehicle width direction outer wall of the front side frame, and that has a vehicle width direction outer end connected to a front end of a side sill.

A second aspect of the present disclosure is the automobile vehicle body structure of the first aspect, wherein the outrigger has a shape projecting out toward the front from the inclined wall of the dashboard panel, and has a two-part construction of an upper member and a lower member integrally connected together by a flange extending along a vehicle width direction.

A third aspect of the present disclosure is the automobile vehicle body structure of the first aspect or the second aspect, wherein the attachment bracket includes a collar that is fixed to an upper face of the lower wall of the attachment bracket, a reinforcement plate that is connected to a rear face of the front wall and the upper face of the lower wall of the attachment bracket and that abuts an upper face of the collar, and a nut that is fixed to an upper face of the reinforcement plate; and a bolt for fastening the support of the subframe penetrates through the collar and screws into the nut.

A fourth aspect of the present disclosure is the automobile vehicle body structure of the second aspect, further including a dash crossmember that is disposed along the vehicle width direction so as to follow a rear face of the inclined wall of the dashboard panel, wherein the automobile vehicle body structure is configured by overlapping the upper member with, and connecting the upper to, the front side frame, the inclined wall of the dashboard panel, and the dash crossmember.

A fifth aspect of the present disclosure is the automobile vehicle body structure of the second aspect, further including a floor frame that is connected to an upper face of a floor panel extending from the inclined wall of the dashboard panel toward the rear, wherein the automobile vehicle body structure is configured by overlapping the lower member with, and connecting the lower member to, the front side frame, the inclined wall of the dashboard panel, and the floor frame.

A sixth aspect of the present disclosure is the automobile vehicle body structure of any one of the first aspect to the fifth aspect, wherein the outrigger is a member having an open cross-section open to the rear and including at least an upper wall, a front wall, and a lower wall. The upper wall has a triangular shape with a width in the front-rear direction that narrows on progression toward the vehicle width direction outside. The front wall and the lower wall have rectangular shapes.

A seventh aspect of the present disclosure is the automobile vehicle body structure of the sixth aspect, wherein the upper wall, the front wall, and the lower wall of the outrigger each include a bead that extends in the vehicle width direction.

An eighth aspect of the present disclosure is the automobile vehicle body structure of any one of the first aspect to the seventh aspect, wherein: the side sill includes a jack-up stiffener that is interposed between an outer member and an inner member; and a front face of the outrigger is mechanically fastened, in the front-rear direction, to an outrigger fixing flange formed by bending a front end of the jack-up stiffener, which projects out from a front end of the side sill toward the front, toward the vehicle width direction inside.

Note that, for example, the lower flange 30*d* and the front flange 31*c* of the embodiments below correspond to flanges of the present disclosure.

According to the configuration in the first aspect, the rear section upper face of the front side frame, which is inclined from the upper front toward the lower rear, connects to the front face of the inclined wall of the dashboard panel, which is inclined from the upper front toward the lower rear, and the support of the subframe is supported using the attachment bracket, which is provided to the rear section lower face of the front side frame and has a triangular shape in side view. The automobile vehicle body structure includes the outrigger having a vehicle width direction inner end connected to the front wall and the lower wall of the attachment bracket and to the vehicle width direction outer wall of the front side frame, and having a vehicle width direction outer end connected to the front end of the side sill. Thus, the attachment bracket is firmly connected to the outrigger and the front side frame, thereby enabling the rigidity of the attachment bracket to be raised and the subframe to be firmly supported, and enabling steering stability of the vehicle to be improved.

According to the configuration in the second aspect, the outrigger has a shape projecting out toward the front from the inclined wall of the dashboard panel, and has a two-part construction of an upper member and a lower member integrally connected together by a flange extending along a vehicle width direction. Accordingly, not only can the upper member and the lower member be easily press-formed without consideration for the draft angle of the press mold, but the upper member and the lower member can be given different material strengths to enable effective reinforcement of the upper member.

According to the configuration in the third aspect, the attachment bracket includes a collar that is fixed to an upper face of the lower wall of the attachment bracket, a reinforcement plate that is connected to a rear face of the front wall and the upper face of the lower wall of the attachment bracket and that abuts an upper face of the collar, and a nut that is fixed to an upper face of the reinforcement plate; and a bolt for fastening the support of the subframe penetrates through the collar and screws into the nut. This not only enables the rigidity of the attachment bracket to be further raised by the reinforcement plate, but also simplifies an attachment operation of the subframe onto the attachment bracket.

According to the configuration in the fourth aspect, the automobile vehicle body structure includes the dash crossmember disposed along the vehicle width direction so as to follow the rear face of the inclined wall of the dashboard panel. The upper member is overlapped with, and connected to, the front side frame, the inclined wall of the dashboard panel, and the dash crossmember in a four-layered overlapped structure. This enables the configuration of the vehicle front section to be improved.

According to the configuration in the fifth aspect, the automobile vehicle body structure further includes a floor frame that is connected to an upper face of a floor panel extending from the inclined wall of the dashboard panel toward the rear. In the automobile vehicle body structure, the lower member is also overlapped with, and connected to, the front side frame, the inclined wall of the dashboard panel, and the floor frame in a four-layered overlapped structure.

According to the configuration in the sixth aspect, the outrigger is a member having an open cross-section open to the rear and including at least an upper wall, a front wall, and a lower wall. The upper wall has a triangular shape with a width in the front-rear direction that narrows on progression toward the vehicle width direction outside, and the front wall and the lower wall have rectangular shapes, thus configuring a large closed cross-section with the inclined wall of the dashboard panel and raising the rigidity of the vehicle body front section, thereby enabling maximum surface area of portions of the outrigger connected to the front side frame and the attachment bracket to be secured, and enabling collision load from a frontal collision to be effectively transmitted frost the front side frame to the outrigger.

According to the configuration in the seventh aspect, the upper wall, the front wall, and the lower wall of the outrigger each include a bead that extends in the vehicle width direction, thereby enabling the rigidity of the outrigger to foe raised further, and enabling the transmission efficiency of collision load from the front side frame to the side sill to be raised.

According to the configuration in the eighth aspect, the side sill includes a jack-up stiffener that is interposed between an outer member and an inner member. The front face of the outrigger is mechanically fastened, in the front-rear direction, to the outrigger fixing flange formed by bending the front end of the jack-up stiffener, which projects out from the front end of the side sill toward the front, toward the vehicle width direction inside. This enables shear load transmitted through the outrigger to be efficiently transmitted to the front end of the side sill.

BRIEF DESCRIPTION OF THE DRAWINGS

The advantages of the disclosure will become apparent in the following description taken in conjunction with the following drawings.

DETAILED DESCRIPTION

Explanation follows regarding an embodiment of the present disclosure based on FIG. 1 to FIG. 6. Note that in the present specification, the front-rear direction, the left-right direction (vehicle width direction) and the up-down direction are defined with reference to an occupant seated in a driving seat.

As illustrated in FIG. 1 to FIG. 4, inclined walls 13a of a dashboard panel 13 rise up toward the upper front from a front end of a floor panel 12 interposed between a pair of left and right side sills 11 and an engine compartment 14 is partitioned off at the front of the dashboard panel 13. A tunnel 15 having a trapezoidal cross-section profile protrudes upward from a vehicle width direction central section of the floor panel 12 so as to span between the inclined walls 13a of the dashboard panel 13. At a lower face of the floor panel 12, a pair of left and right tunnel reinforcement frames 16 is disposed along the front-rear direction so as to follow along both vehicle width direction sides of the tunnel 15. Moreover, at an upper face of the floor panel 12, a left and right pair of floor frames 17 is disposed along the front-rear direction at the vehicle width direction outside of the respective left and right tunnel reinforcement frames 16.

Respective rear sections of a left and right pair of front side frames 18, disposed along the front-rear direction inside the engine compartment 14, are curved with their thicknesses in the up-down direction decreasing on progression toward the lower rear. The respective rear sections are connected to the front faces of the inclined walls 13a of the dashboard panel 13, which are inclined from a front end of the floor panel 12 toward the upper front. Front ends of the floor frames 17 curve forward and upwards and are connected to respective rear faces of the inclined walls 13a of the dashboard panel 13 that are inclined toward the upper front. Rear ends of the front side frames 18 and front ends of the floor frames 17 are respectively aligned with each other in the front-rear direction, with the respective inclined walls 13a of the dashboard panel 13 interposed therebetween.

As illustrated in FIG. 2 to FIG. 4 and FIG. 6, the rear section of each front side frame 18 includes a lower wall 18a, a vehicle width direction inner wall 18b that projects out from a vehicle width direction inner end of the lover wall 18a, a vehicle width direction outer wall 18c that projects out from a vehicle width direction outer end of the lower wall 18a, an inside flange 18d that is formed by bending an upper end of the vehicle width direction inner wall 18b toward the vehicle width direction inside, and an outside flange 18e that is formed by bending an upper end of the vehicle width direction outer wall 18c toward the vehicle width direction outside. The rear section of each front side frame 18 is formed with an inverted hat shaped cross-section, and the inside flange 18d and the outside flange 18e are connected to a front face of the respective inclined wall 13a of the dashboard panel 13.

An attachment bracket 19 provided at a lower face of the rear section of each front side frame 18 is a triangular shaped member in side view, and includes a front wall 19a, a lower wall 19b, a vehicle width direction inner wall 19c, a vehicle width direction outer wall 19d, a front flange 19e that extends from a front portion of the front wall 19a toward the front, a rear flange 19f that extends from a rear portion of the lower wall 19b toward the rear, an inside flange 19g that extends upward from an upper portion of the vehicle width direction inner wall 19c, and an outside flange 19h that extends upward from an upper portion of the vehicle width direction outer wall 19d. The front flange 19e and the rear flange 19f are connected to the lower wall 18a of the front side frame 18. The vehicle width direction inner wall 19c and the vehicle width direction outer wall 19d are respectively connected to the vehicle width direction inner wall 18b and the vehicle width direction outer wall 18c of the front side frame 18.

A reinforcement plate 20 disposed inside each attachment bracket 19 includes an upper wall 20a, a vehicle width direction outer wall 20b, a rear wall 20c, two front flanges 20d, 20e that are respectively formed by bending a front end of the upper wall 20a and a front end of the vehicle width direction outer wall 20b, an inside flange 20f that is formed by bending a vehicle width direction inner end of the upper wall 20a, an outside flange 20g that is formed by bending a lower end of the vehicle width direction outer wall 20b, and a rear flange 20h that extends from a rear end of the rear wall 20c. The two front flanges 20d, 20e are connected to the front wall 19a of the attachment bracket 19, the inside flange 20f is connected to the vehicle width direction inner wall 19c of the attachment bracket 19, the outside flange 20g is connected to the lower wall 19b of the attachment bracket 19, and the rear flange 20h is connected so as to be interposed between the rear flange 19f of the attachment bracket 19 and the inclined wall 13a of the dashboard panel 13.

A collar 21 is respectively provided between the lower wall 19b of each attachment bracket 19 and the upper wall 20a of each reinforcement plate 20. A nut 22 is provided coaxially to each collar 21 at an upper face of the upper wall 20a of the reinforcement plate 20. A rectangular frame shaped subframe 23 having an open center portion is disposed in the engine compartment 14. Bolts 24 penetrate through respective supports 23a of left and right rear portions of the sub frame 23 and the respective collars 21, and are screwed into the respective nuts 22. The left and right supports 23a of the sub frame 23 are thereby fastened to the attachment brackets 19.

Figure 3:
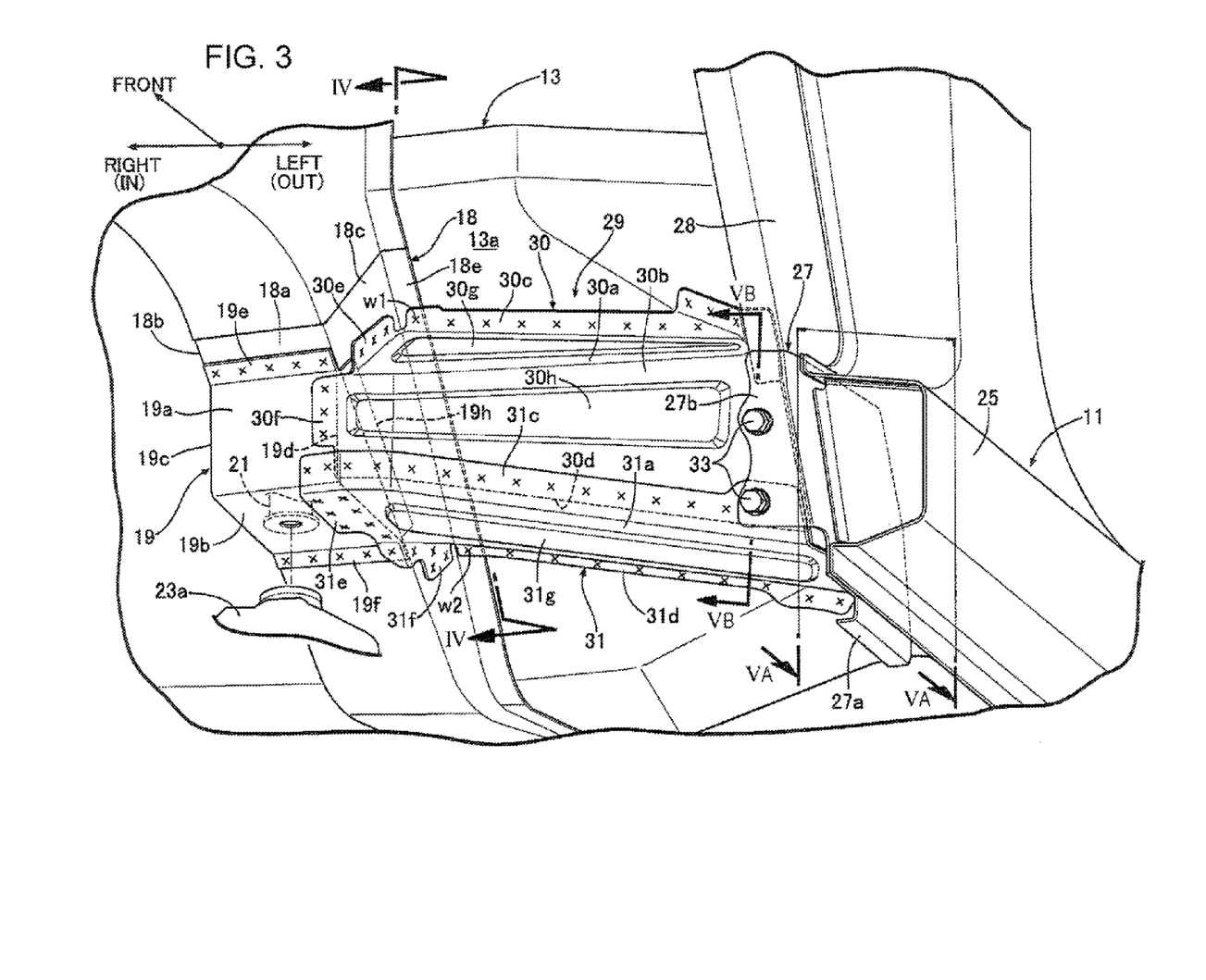
FIG. 3 is a drawing as viewed along the arrow III direction in FIG. 2.
Figure 5A:
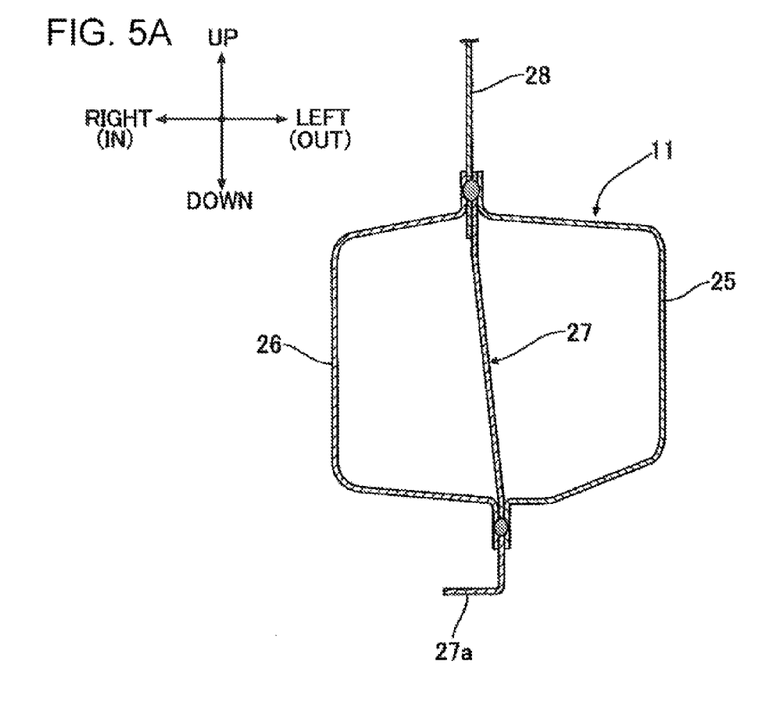
FIG. 5A and FIG. 5B are cross-sections respectively taken along line VA-VA and line VB-VB in FIG. 3.
Figure 5B:
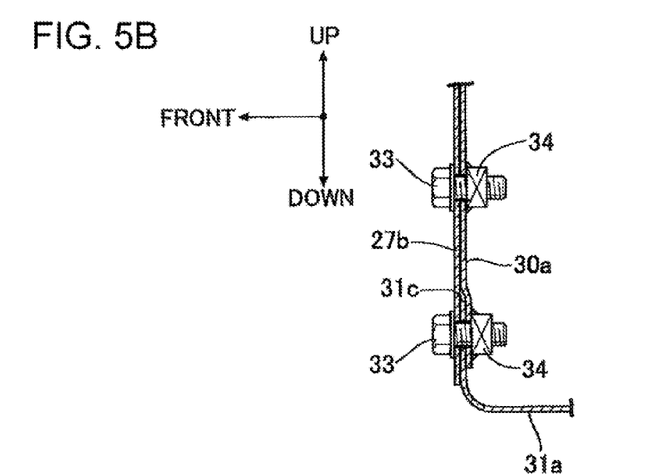
Figure 6:
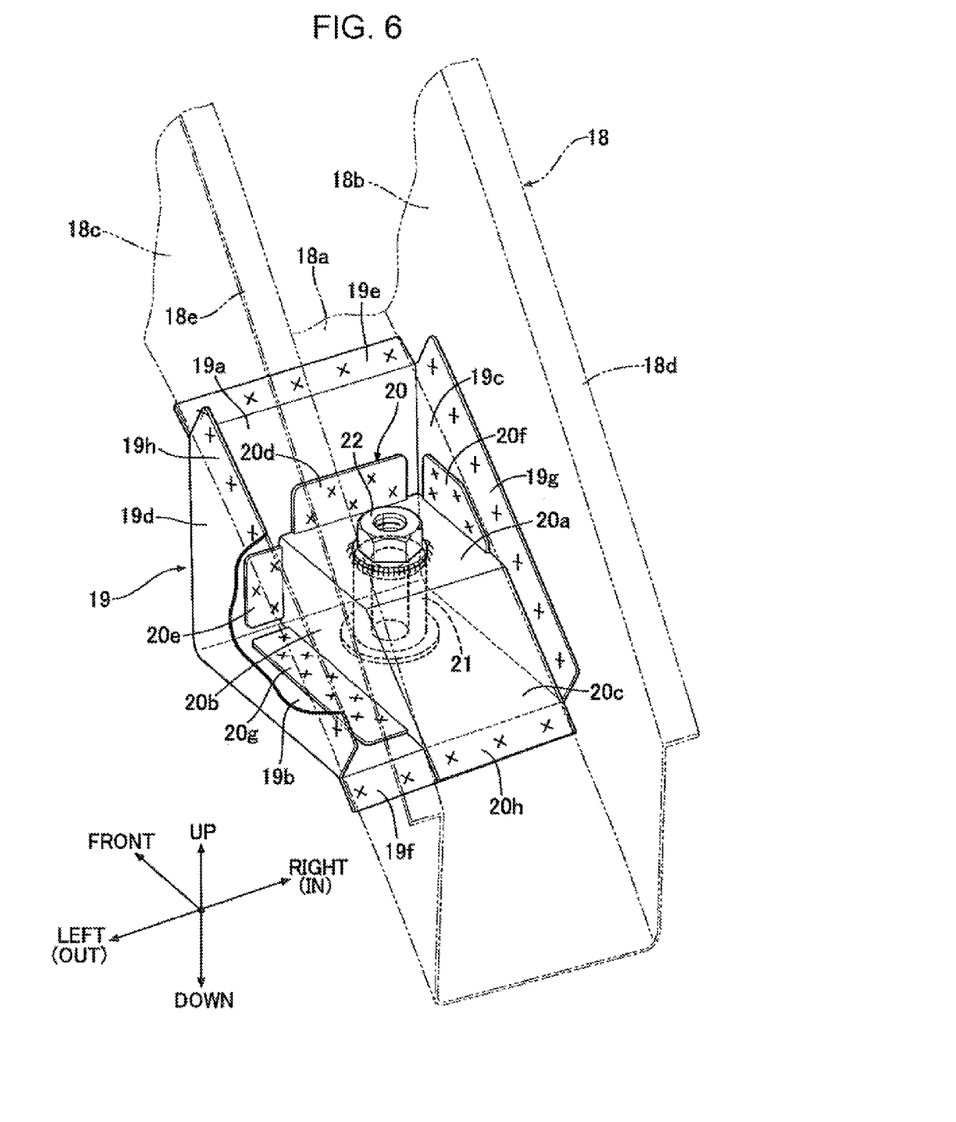
FIG. 6 is a drawing as viewed along the arrow VI direction in FIG. 2.

As illustrated in FIG. 3 and FIG. 5A, in each side sill 11, an outer member 25 that has a hat shaped cross-section open to the vehicle width direction inside, and an inner member 26 that has a hat shaped cross-section open to the vehicle width direction outside, are connected together such that a jack-up stiffener 27 and an inner front pillar 28 are interposed therebetween. A jack-up flange 27a is formed at a lower end of the jack-up stiffener 27 by bending the jack-up stiffener 27 toward the vehicle width direction inside, and an outrigger fixing flange 27b is formed at a front end of the jack-up stiffener 27 by bending the jack-up stiffener 27 toward the vehicle width direction inside.

Figure 1:
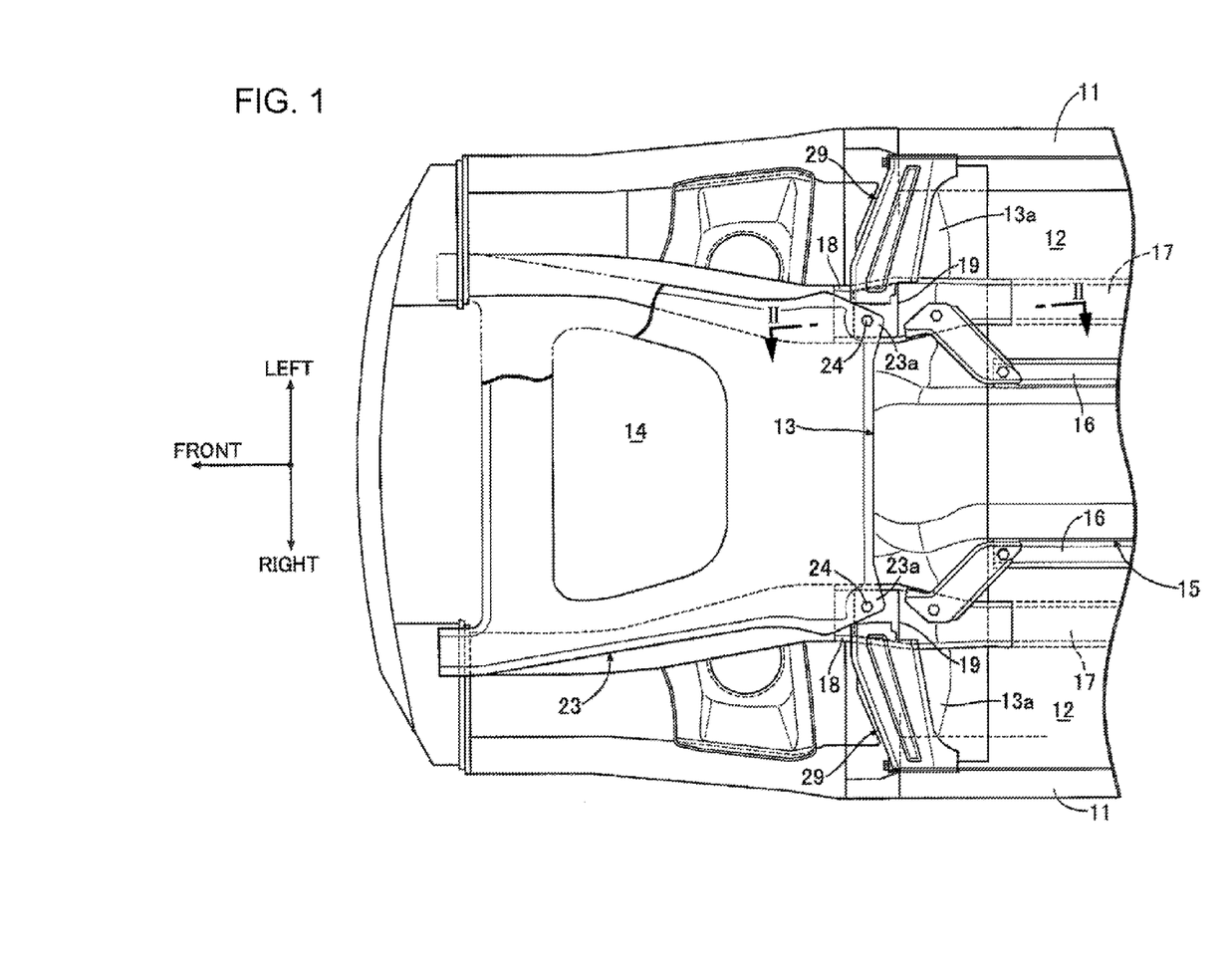
FIG. 1 is a bottom view of a vehicle body front section of an automobile according to one embodiment.
Figure 2:
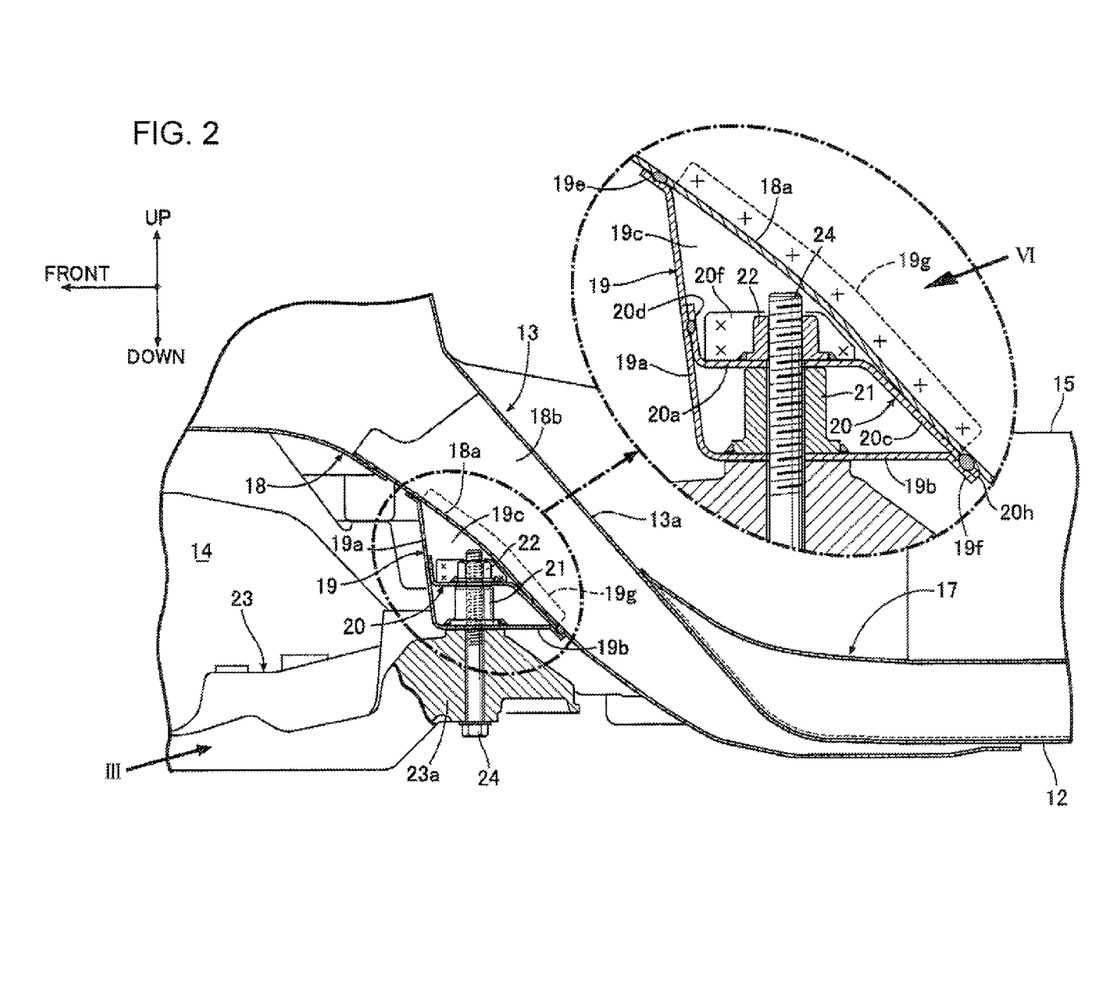
FIG. 2 is a cross-section taken along line II-II in FIG. 1.
Figure 4:
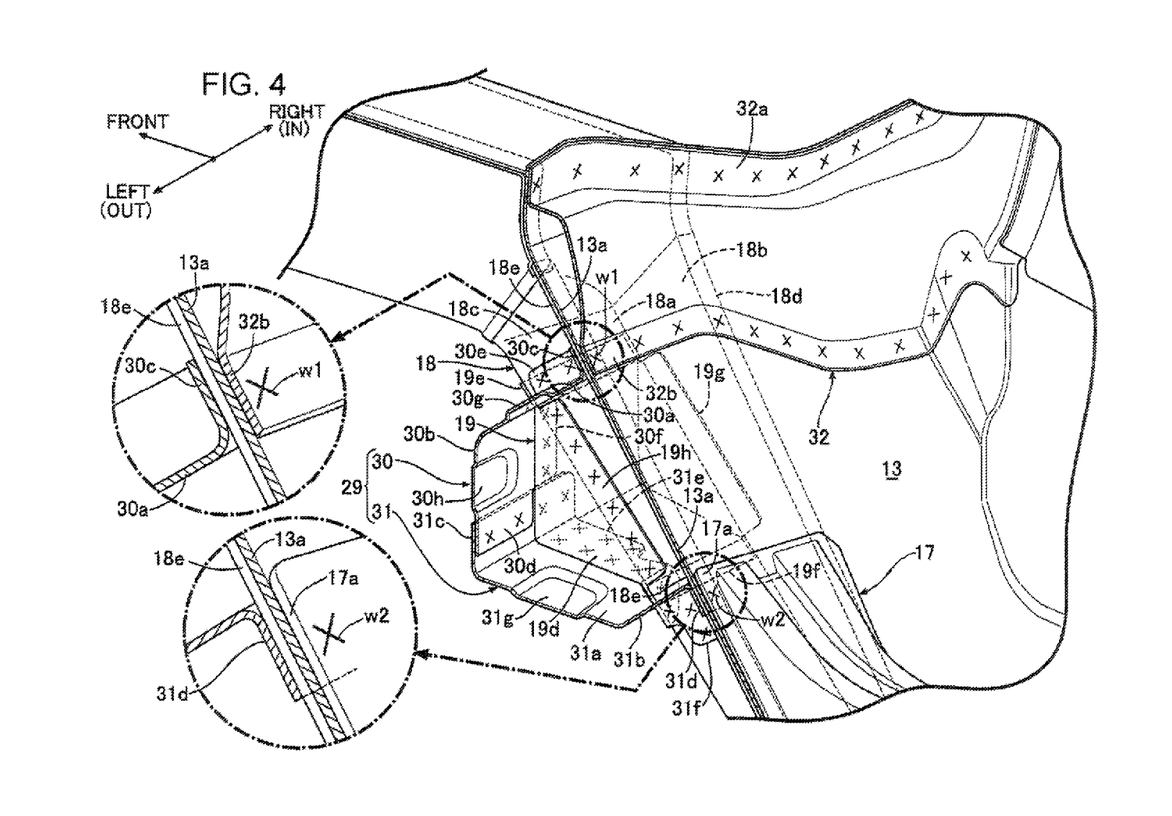
FIG. 4 is a cross-section taken along line IV-IV in FIG. 3.

As illustrated in FIG. 1, FIG. 3, and FIG. 4, an outrigger 29 is disposed along the vehicle width direction and is connected to the attachment bracket 19 and a front end of the side sill 11. An upper member 30 and a lower member 31 are connected together to form the outrigger 29 with an open cross-section that is open to the rear. The outrigger 29 is connected to a front face of the respective inclined wall 13a of the dashboard panel 13 so as to project out toward the front, thereby configuring a closed cross-section.

The upper member 30 includes an upper wall 30a, a front wall 30b, an upper flange 30c that is formed by bending an upper end of the upper wall 30a, a lower flange 30d that extends from a lower end of the front wall 30b, a first inner end flange 30e that is formed by bending a vehicle width direction inner end of the upper wall 30a, and a second inner end flange 30f that extends from a vehicle width direction inner end of the front wall 30b. The upper wall 30a has a triangular shape that narrows in width on progression toward the vehicle width direction outside, and a bead 30g that extends along the vehicle width direction Ls formed at a central portion of the upper wall 30a. The front wall 30b has a rectangular shape with a substantially uniform width running along the vehicle width direction, and a bead 30h that extends along the width direction is formed at a central portion of the front wall 30b.

The lower member 31 includes a lower wall 31a, a rear wall 31b, a front flange 31c that is formed by bending a front end of the lower wall 31a, a rear flange 31d that is formed by bending a rear end of the rear wall 31b, a third inner end flange 31e that extends from a vehicle width direction inner end of the lower wall 31a, and a fourth inner end flange 31f that is formed by bending a vehicle width direction inner end of the rear wall 31b. The lower wall 31a has a rectangular shape with a substantially uniform width running along the vehicle width direction, and a bead 31g that extends along the vehicle width direction is formed at a central portion of the lower wall 31a.

Each of the outriggers 23 is assembled by superimposing and connecting together the thus shaped lower flange 30d of the upper member 30 and the thus shaped front flange 31c of the lower member 31. A closed cross-section is configured between the inclined wall 13a of the dashboard panel 13 and the outrigger 29 by connecting the upper flange 30c of the upper member 30 and the rear flange 31d of the lower member 31 of the outrigger 29 to the front face of the inclined wall 13a of the dashboard panel 13.

Moreover, the first inner end flange 30e of the upper member 30 and the fourth inner end flange 31f of the lower member 31 are connected to the vehicle width direction outer wall 18c of the front side frame 18, the second inner end flange 30f of the upper member 30 is connected to the front wall 19a of the attachment bracket 19, and the third inner end flange 31e of the lower member 31 is connected to the lower wall 19b of the attachment bracket 19. A vehicle width direction inner end of the outrigger 29 is thus connected to the front side frame 18 and the attachment bracket 19.

An upper flange 32a and a lower flange 32b of a dash crossmember 32, which is open toward the front, are connected to the rear face of the inclined wall 13a of the dashboard panel 13. A closed cross-section is thereby configured between the inclined wall 13a of the dashboard panel 13 and the dash crossmember 32. The upper flange 30c of the upper member 30 of the outrigger 29, the outside flange 18e of the front side frame 18, the inclined wall 13a of the dashboard panel 13, and the lower flange 32b of the dash crossmember 32 (see FIG. 4) are overlapped with each other in a four-layered overlapped structure and welded together with welds W1. Moreover, the rear flange 31d of the lower member 31 of the outrigger 29, the outside flange 18e of the front side frame 18, the inclined wall 13a of the dashboard panel 13, and an outside flange 17a of the floor frame 17 (see FIG. 4) are overlapped with each other in a four-layered overlapped structure and welded with welds W2.

A vehicle width direction outer end of each of the outriggers 29 is abutted against a vehicle width direction inner face of the respective inner front pillar 28. The front wall 30b of the upper member 30 and the front flange 31c of the lower member 31 of the outrigger 29 are fastened to the outrigger fixing flange 27b of the jack-up stiffener 27 using two bolts 33 extending along the front-rear direction and nuts 34.

Next, explanation follows regarding operation of an embodiment of the present disclosure provided with the above configuration.

The attachment brackets 19 are provided to the lower face of the rear section of the respective front side frames 18 and the subframe 23 fastened to the attachment brackets 19 using the bolts 24 supports front, wheel suspension devices. In such a structure, if the support rigidity of the subframe 23 with respect to the front side frames 18 were insufficient, there is a possibility that steering stability of the vehicle might be adversely affected.

However, in the present embodiment, the outrigger 29 is connected to the front face of the inclined wall 13a of the dashboard panel 13, thereby configuring a closed cross-section. The second inner end flange 30f and the third inner end flange 31e at the vehicle width direction inner end of the outrigger 29 are also respectively connected to the front wall 19a and the lower wall 19b of the attachment bracket 19, the first inner end flange 30e and the fourth inner end flange 31f are connected to the vehicle width direction outer wall 18c of the front side frame 18, and the vehicle width direction outer end of the outrigger 29 is connected to the front end of the side sill 11. Thus, the attachment bracket 19 and the front side frame 18 are firmly connected together through the outrigger 29, and the attachment bracket 19 is firmly connected to the side sill 11 through the outrigger 29. This enables the rigidity of the attachment bracket 19 to be raised. This accordingly enables the support rigidity of the subframe 23 to be raised, and the steering stability of the vehicle to be secured.

The outrigger 29 has a shape that projects out from the inclined wall 13a of the dashboard panel 13 toward the front, and has a two-part construction of the upper member 30 and the lower member 31, which are integrally connected together by the lower flange 30d and the front flange 31c extending along the vehicle width direction. Accordingly, not only can the upper member 30 and the lower member 31 be easily press-formed without consideration for the draft angle of the press mold, but the upper member 30 and the lower member 31 can be given different material strengths to enable effective reinforcement of the attachment bracket 19.

Moreover, the attachment bracket 19 includes: the collar 21 that is fixed to the upper face of the lower wall 19b, the reinforcement plate 20 that is connected to the rear face of the front wall 19a and to the upper face of the rear flange 19f of the lower wall 19b and that contacts an upper face of the collar 21, and the nut 22 that is fixed to the upper wall 20a of the reinforcement plate 20. The support 23a of the subframe 23 is fastened to the attachment bracket 19 by the bolt 24 that penetrates the collar 21 and screws into the nut 22. This not only enables the rigidity of the attachment bracket 19 to be further raised by the reinforcement plate 20, but also simplifies an attachment operation of the subframe 23 onto the attachment bracket 19.

The upper flange 30c of the upper member 30 of the outrigger 29, the outside flange 18e of the front side frame 18, the inclined wall 13a of the dashboard panel 13, and the lower flange 32b of the dash crossmember 32 are overlapped with each other in a tour-layered overlapped structure and connected together using the spot welds W1 (see FIG. 3 and FIG. 4). This enables the rigidity of the attachment bracket 19 and the configuration of the vehicle front section to be improved.

Moreover, the rear flange 31d of the lower member 31 of the outrigger 29, the outside flange 18e of the front side frame 18, the inclined wall 13a of the dashboard panel 13, and the outside flange 17a of the floor frame 17 are overlapped with each other in a four-layered overlapped structure and connected together using the spot welds W2 (see FIG. 3 and FIG. 4). This enables the rigidity of the attachment bracket 19 and the configuration of the vehicle front section to be improved.

The outrigger 29 includes the upper wall 30a, the front wall 30b, the lower wall 31a, and the rear wall 31b; the outrigger 29 is a member with an open cross-section that opens toward the rear. The upper wall 30a has a triangular shape with a width in the front-rear direction that narrows on progression toward the vehicle width direction outside, and the front wall 30b and the lower wall 31a have rectangular shapes, thus configuring a large closed cross-section with the inclined wall 13a of the dashboard panel 13 and raising the rigidity of the vehicle body front section, thereby enabling maximum surface area of portions of the outrigger 29 connected to the front side frame 18 and the attachment bracket 19 to be secured, and enabling collision load from a frontal collision to be effectively transmitted from the front side frame 18 to the outrigger 29.

Moreover, the upper wall 30a, the front wall 30b, and the lower wall 31a of the outrigger 29 respectively include the beads 30g, 30h, and 31g extending along the vehicle width direction, thereby enabling the rigidity of the outrigger 29 to be raised further, and enabling transmission efficiency of collision load from the front side frame 18 to the side sill 11 in a frontal collision to be raised.

The side sill 11 includes the jack-up stiffener 27 interposed between the outer member 25 and the inner member 26. The front face of the outrigger 29 is fastened to the outrigger fixing flange 27b, formed by bending toward the vehicle width direction inside, the front end of the jack-up stiffener 27, which projects out from the front end of the side sill 11 toward the front, using the bolts 33 extending along the front-rear direction. This enables shear load transmitted through the outrigger 29 to be efficiently transmitted to the front end of the side sill 11.

Explanation of an embodiment of the present disclosure has been given above; however, various design modifications may be made within a range not departing from the spirit of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An automobile vehicle body structure comprising:
    a dashboard lower panel including a inclined wall inclined downward from an upper front thereof toward a lower rear thereof;
    a front side frame including a rear section upper face inclined downward from an upper front thereof toward a lower rear thereof, the rear section upper face connected to a front face of the inclined wall of the dashboard lower panel;
    an attachment bracket provided to a rear section lower face of the front side frame and having a triangular shape in side view;
    a subframe including a support portion attached to and supported by the attachment bracket; and
    an outrigger that extends in a vehicle width direction and has a vehicle width direction inner end connected to a front wall and a lower wall of the attachment bracket and connected to a vehicle width direction outer wall of the front side frame, and that has a vehicle width direction outer end connected to a front end of a side sill.

2. The automobile vehicle body structure of claim 1, wherein:
    the outrigger has a shape projecting oat toward the front from the inclined wall of the dashboard lower panel, and has a two-part construction of an upper member and a lower member integrally connected together by a flange extending along a vehicle width direction.

3. The automobile vehicle body structure of claim 1, wherein:
    the attachment bracket includes
        a collar that is fixed to an upper face of the lower wall of the attachment bracket,
        a reinforcement plate that is connected to a rear face of the front wall and the upper face of the lower wall of the attachment bracket and that abuts an upper face of the collar, and
        a nut that is fixed to an upper face of the reinforcement plate; and
    the support portion of the subframe is fastened by a bolt penetrating through the collar and screwing into the nut.

4. The automobile vehicle body structure of claim 2, further comprising a dash crossmember that is disposed along a rear face of the inclined wall of the dashboard panel and extends in the vehicle width direction,
    wherein the upper member is overlapped with the front, side frame, the inclined wall of the dashboard lower panel, and the dash crossmember so as to have a four-layered overlapped structure.

5. The automobile vehicle body structure of claim 2, further comprising a floor frame that is connected to an upper face of a floor panel extending from the inclined wall of the dashboard lower panel toward the rear,
    wherein the lower member is overlapped with the front side frame, the inclined wall of the dashboard lower panel, and the floor frame so as to have a four-layered overlapped structure.

6. The automobile vehicle body structure of claim 1, wherein:
    the outrigger is a member having an open cross-section open to the rear and including at least an upper wall, a front wall, and a lower wall,
    the upper wall has a triangular shape with a width size in the front-rear direction that becomes narrower toward the vehicle width direction outside, and
    the front wall and the lower wall have a rectangular shape, respectively.

7. The automobile vehicle body structure or claim 6, wherein the upper wall, the front wall, and the lower wall of the outrigger each include a bead that extends in the vehicle width direction.

8. The automobile vehicle body structure of claim 1, wherein:
    the side sill includes an outer member, an inner member, and a jack-up stiffener interposed between the outer member and the inner member,
    the jack-up stiffener includes a front end projecting forward from a front end of the side sill and bending toward the vehicle width direction inside so as to constitute an outrigger fixing flange, and
    a front face of the outrigger is mechanically fastened, in the front-rear direction, to the outrigger fixing flange.

9. The automobile vehicle body structure of claim 2, wherein the upper member and the lower member have different material strengths from each other.

10. The automobile vehicle body structure of claim 8, wherein the side sill extends in a longitudinal direction.

11. A vehicle comprising the automobile vehicle body structure of claim 1.

* * * * *